June 25, 1946.　　　A. A. MICHAEL　　　2,402,828
SLACK ADJUSTER FOR BRAKES
Filed June 1, 1945
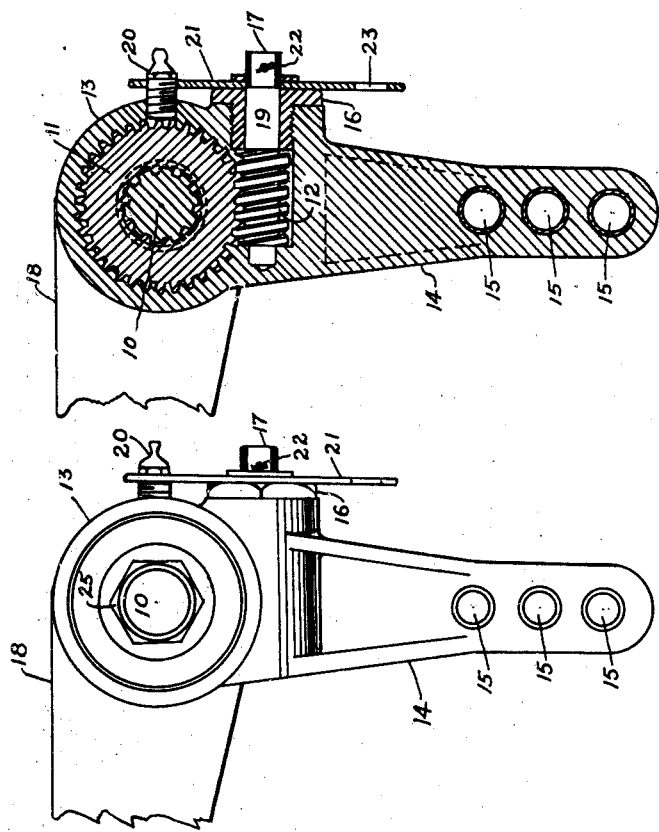
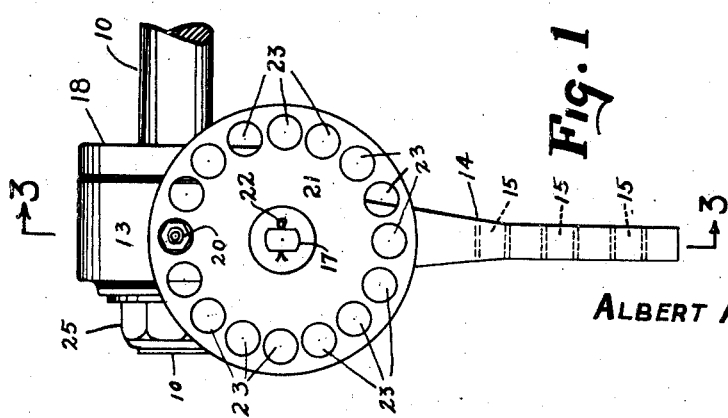
ALBERT ARLIN MICHAEL
Inventor
By Paul S. Eaton
Attorney Patented June 25, 1946

2,402,828

UNITED STATES PATENT OFFICE 2,402,828

SLACK ADJUSTER FOR BRAKES

Albert Arlin Michael, Charlotte, N. C.

Application June 1, 1945, Serial No. 597,114

2 Claims. (Cl. 74—522)

This invention relates to a brake mechanism and more especially to power operated brake mechanism such as is employed on trailers and the like for hauling heavy loads. These trailers or trucks have brake shoes with an oscillatable shaft for expanding the brake shoes and an arm is taken off of this shaft which serves as a lever for connection to brake operating means, which may be compressed air or pneumatic means, for operating the lever. These levers are usually adjustably secured on the brake operating shaft by means of the brake operating shaft having a worm gear fixed thereon and a worm is mounted in the lever whereby by turning the worm the shaft can be rotated relative to the lever and thus take up slack or wear in the linking mechanism between the operating means for moving the shaft for expanding the brake.

Various means have been provided for holding this worm in adjusted position but the heavy traffic and heavy shocks which are imparted to a truck or a trailer cause these spring compressed or other means to jar out of position and thus allow the position of the lever to change relative to the shaft and thus the braking power is seriously affected.

It is an object of this invention to provide in a brake system having an oscillatable shaft with a worm thereon and a lever mounted on the shaft having a gear therein for engaging the worm for changing the angularity of the lever with relation to the shaft by providing means for holding the worm in adjusted position in such a manner that it cannot be jarred out of position after it has once been set in the desired position.

It is another object of this invention to provide means for adjusting a brake lever on a brake shaft and holding the adjustment in the position to which it is adjusted so that it cannot be jarred from its adjusted position by shocks of the road.

Some of the objects of the invention having been stated, other objects will appear as the description proceeds when taken in connection with the accompanying drawing in which:

Figure 1 is an elevation of one end of a brake shaft and showing the lever thereon with the invention attached;

Figure 2 is an elevation looking from the left hand side of Figure 1;

Figure 3 is a vertical sectional view taken substantially along the line 3—3 in Figure 1.

Referring more specifically to the drawing the numeral 10 indicates the oscillatable shaft which extends into the brake drum and has a cam, usually a double-ended cam, for expanding the brake shoes within the drum. This shaft 10 has fixedly secured thereon a worm wheel 11 which is adapted to be engaged by a worm 12 rotatably mounted in a hub portion 13 which has extending downwardly therefrom a lever 14 having a plurality of holes 15 therein into which there is adapted to be fitted suitable linking mechanisms which extends to the brake operating mechanism not shown. This worm 12 is secured in position in a conventional manner by means of a nut 16 threadably mounted in the housing 13 and it has an extension 19 provided with a flat portion 17 which heretofore has been adapted to receive a suitable lever or handle by means of which the worm 12 can be rotated to thus change the position of the lever 14 relative to the shaft 10. It often happens, though, that the jars of the road would cause this worm 12 to rotate and thus allow too much slack to occur in the connection between the shaft 10 and the operating mechanism. The housing 13 is equipped with a conventional grease fitting 20 which usually is of shorter length than that shown in the drawing.

I propose to provide a disk 21 having a central opening which is adapted to fit over the flat portion 17 of the extension 19 of worm 12. This disk 21 is removably secured in position by means of a cotter key 22. This disk 21 has a plurality of openings or holes 23 equally spaced from the center of the disk and through which the grease fitting 20 is adapted to be inserted and screwed into position within the housing 13.

The shaft 10 is rotatably supported in a suitable bracket 18 which is affixed to the framework of the truck or trailer. The housing 13 is rotatably confined on the shaft 10 by means of a nut 25 threadably secured on the shaft 10.

It is thus seen that when adjustment of the lever 14 relative to the shaft 10 is desired, the grease fitting 20 may be removed and the disk 21 serving as a handle enables the operator to turn the worm 12 to thus adjust the position of the lever 14 relative to the shaft 10 to the proper amount. Then with one of the holes 23 registering with the opening in the housing 13, so that grease fitting 20 can be screwed back into position, the disk 21 is thus locked in position and worm 12 cannot rotate and thus the adjustment will remain in fixed position.

In the drawing and specification there has been set forth a preferred embodiment of the invention, and although specific terms are employed, they are used in a generic and descriptive sense only, and not for purposes of limitation, the scope of the invention being defined in the claims.

I claim:

1. In a slack adjusting mechanism for association with an actuating shaft and comprising an actuating arm, a worm wheel rotatably supported in the arm and secured to the actuating shaft, a worm mounted in the arm and cooperating with the worm wheel, said worm having an extension which extends outside of the arm, a disk secured on the extension of the worm wheel on the outside of the arm and having a plurality of holes disposed in a circle whose center is the center of the extension, said arm having a grease fitting threadably secured therein for supplying a lubricant to the worm wheel, said grease fitting extending through one of the holes in the disk to hold it in adjusted position.

2. In a brake mechanism for trucks, trailers and the like having an oscillatable shaft for expanding the brake shoes, said shaft having fixed thereon a worm wheel, a lever having a chamber surrounding the worm wheel, said lever having rotatably mounted therein a worm shaft meshing with the worm wheel and extending to the exterior of the lever, said lever also having a grease fitting threadably secured therein and communicating with the chamber surrounding the worm wheel, a disk member secured on that portion of the worm shaft which extends outside the lever, said disk having a plurality of holes therein disposed adjacent the periphery of the disk and spaced from each other and equally spaced from the center of the disk so as to register with the grease fitting, said grease fitting being of a size to be inserted through one of the holes and screwed into position to thereby hold the disk in adjusted position.

ALBERT ARLIN MICHAEL.